US011520931B2

(12) United States Patent
Yim et al.

(10) Patent No.: US 11,520,931 B2
(45) Date of Patent: Dec. 6, 2022

(54) PRIVACY MASKING METHOD USING FORMAT-PRESERVING ENCRYPTION IN IMAGE SECURITY SYSTEM AND RECORDING MEDIUM FOR PERFORMING SAME

(71) Applicant: SOONCHUNHYANG UNIVERSITY INDUSTRY ACADEMY COOPERATION FOUNDATION, Asan-si (KR)

(72) Inventors: Kang-Bin Yim, Asan-si (KR); Kyung-Roul Lee, Asan-si (KR)

(73) Assignee: SOONCHUNHYANG UNIVERSITY INDUSTRY ACADEMY COOPERATION FOUNDATION, Asan-si (KR)

( * ) Notice: Subject to any disclaimer, the term of this patent is extended or adjusted under 35 U.S.C. 154(b) by 385 days.

(21) Appl. No.: 16/593,511

(22) Filed: Oct. 4, 2019

(65) Prior Publication Data

US 2020/0250341 A1 Aug. 6, 2020

(30) Foreign Application Priority Data

Feb. 1, 2019 (KR) .................. 10-2019-0013339

(51) Int. Cl.
*G06F 21/00* (2013.01)
*G06F 21/62* (2013.01)
*G06F 21/60* (2013.01)
*H04L 9/40* (2022.01)
*G06V 40/16* (2022.01)

(52) U.S. Cl.
CPC ........ *G06F 21/6263* (2013.01); *G06F 21/602* (2013.01); *G06F 21/6245* (2013.01); *G06V 40/166* (2022.01); *H04L 63/0428* (2013.01)

(58) Field of Classification Search
None
See application file for complete search history.

(56) References Cited

U.S. PATENT DOCUMENTS

| 2010/0158325 | A1* | 6/2010 | Piramuthu | ................ G06T 7/11 382/118 |
| 2011/0150327 | A1* | 6/2011 | Yoo | ............................ G06T 1/00 382/165 |
| 2020/0235922 | A1* | 7/2020 | Minner | ................. H04L 9/0861 |

* cited by examiner

*Primary Examiner* — Andrew J Steinle
(74) *Attorney, Agent, or Firm* — Studebaker & Brackett PC

(57) ABSTRACT

The present invention discloses a privacy masking method using format-preserving encryption in an image security system, and a recording medium for performing the method. In a privacy masking method using format-preserving encryption in an image security system according to an aspect of the present invention, an image corresponding to a privacy region is encrypted using format-preserving encryption, so that it is possible to prevent waste of additional storage space required for encryption and to solve a problem of exposure of personal information.

5 Claims, 4 Drawing Sheets

PA

PRIVACY MASKING METHOD USING FORMAT-PRESERVING ENCRYPTION IN IMAGE SECURITY SYSTEM AND RECORDING MEDIUM FOR PERFORMING SAME

CROSS REFERENCE TO RELATED APPLICATION

The present application claims priority to Korean Patent Application No. 10-2019-0013339, filed Feb. 1, 2019, the entire contents of which is incorporated herein for all purposes by this reference.

BACKGROUND OF THE INVENTION

Field of the Invention

The present invention relates generally to a privacy masking method using format-preserving encryption in an image security system, and a recording medium for performing the method. More particularly, the present invention relates to a privacy masking method using format-preserving encryption in an image security system and a recording medium for performing the method, wherein format-preserving encryption is used in encrypting a privacy region in a collected image, thereby more efficiently performing masking on the privacy region.

Description of the Related Art

For the safety of individuals and the public, a video surveillance system has been introduced in which a device for recording a video, e.g. a closed-circuit television (CCTV), is installed in a place, such as a road and a building, to monitor the place. The video surveillance system collects and records videos taken in various places in real time. The recorded video is utilized as evience when events and accidents occur in the future. For this reason, an image security system with integrity and confidentiality has been introduced to enhange reliability of a video transmitted from a camera and recorded.

However, such a video surveillance system and an image security system obtain images containing personal information such as images of people, vehicle identification numbers, and the like. Therefore, problems of personal information leakage, privacy invasion, and the like may occur.

In order to solve these problems, a privacy masking technique of an image security system has been introduced to protect a region related to personal information in an image. In the privacy masking technique, the region related to the personal information within the image encrypted for storage, and if the image needs to be checked later, the investigation agency can obtain the evidence by decrypting the encrypted image. In this technique, in order to reduce waste of time required for encrypting/decrypting the entire image, only the region related to the personal information is encrypted, but due to the characteristics of encryption, the size of data required for cipher is fixed to a block size. Thus, if the size of the region to be subjected to masking does not equal to the block size, there are problems such as utilization of an additional storage, waste of storage space, and an increase in image size.

The foregoing is intended merely to aid in the understanding of the background of the present invention, and is not intended to mean that the present invention falls within the purview of the related art that is already known to those skilled in the art.

SUMMARY OF THE INVENTION

The present invention has been made keeping in mind the above problems occurring in the related art, and the present invention is intended to propose a privacy masking method using format-preserving encryption in an image security system and a recording medium for performing the method, wherein an image corresponding to a privacy region is encrypted using a privacy masking technique utilizing format-preserving encryption and it is possible to prevent waste of required additional storage space and to prevent increase in image size.

Other objects and advantages of the present invention will be understood from the following descriptions and become apparent by the embodiments of the present invention. Also, it is understood that the objects and advantages of the present invention may be implemented by components defined in the appended claims or their combinations.

In order to achieve the above object, according to one aspect of the present invention, there is provided a privacy masking method using format-preserving encryption in an image security system, the method including: receiving, from an image surveillance system, an image obtained at at least one place; identifying whether information related to privacy is present within the received image; extracting, when the information related to privacy is present as a result of the identification, a privacy region from the received image; calculating a size of an image with respect to the extracted privacy region; generating a block size for generating ciphertext in such a manner as to be equal to the calculated image size; generating the ciphertext by using format-preserving encryption according to the generated block size, and generating a privacy masking image by using the generated ciphertext; and inserting the encrypted privacy region image to the region related to privacy within the image received from the image surveillance system.

The generating of the block size for generating the ciphertext in such a manner as to be equal to the calculated image size may include: a primary block size generation step in which the block size in a fixed size is generated; and a secondary block size generation step in which the block size in a variable size is generated by subtracting the generated block size in the fixed size from the calculated image size.

The generating of the ciphertext by using format-preserving encryption according to the generated block size, and the generating of the privacy masking image by using the generated ciphertext may include: generating the ciphertext by using format-preserving encryption according to the generated block size, and generating the encrypted privacy region image by inserting the generated ciphertext to a position corresponding to the privacy region.

In the format-preserving encryption, a length of the ciphertext may be variably determined according to a size of the image that needs to be encrypted, and masking may be performed on the privacy region.

The information related to privacy may be at least one among a person's face, a vehicle identification number, and an exposure-prohibited region.

In order to achieve the above object, according to another aspect of the present invention, there is provided a computer-readable recording medium having a computer program recorded thereon, the recording medium for performing a privacy masking method using format-preserving encryption in an image security system.

According to an aspect of the present invention, the image corresponding to the privacy region is encrypted using format-preserving encryption, so that it is possible to prevent waste of additional storage space required for encryption and to solve the problem of exposure of the personal information.

Also, increase in image size, which occurs when encrypting the image, does not occur, so that it is possible to more efficiently use storage space.

Effects that may be obtained from the present invention will not be limited to only the above described effects. In addition, other effects which are not described herein will become apparent to those skilled in the art from the following description.

BRIEF DESCRIPTION OF THE DRAWINGS

The accompanying drawings illustrate a preferred embodiment of the present invention and together with the specific details, serve to provide further understanding of the technical features of the present invention, and thus, the present invention is not construed as being limited to the drawings, in which.

DETAILED DESCRIPTION OF THE INVENTION

The above-described objects, features, and advantages will be more clearly understood from the following detailed description with reference to the accompanying drawings. Accordingly, the technical scope of the present invention can be easily embodied by those skilled in the art to which the present invention belongs. Also, in describing the present invention, it is decided that if a detailed description of the known art related to the present invention makes the subject matter of the present invention unclear, the detailed description will be omitted. Hereinafter, preferred embodiments of the present invention will be described with reference to the accompanying drawings.

Throughout the specification, when a part "includes" an element, it is noted that it further includes other elements, but does not exclude other elements, unless specifically stated otherwise. Also, the terms "~part", and the like described in the specification mean a unit for processing at least one function or operation and may be implemented by a combination of hardware and/or software.

Figure 1:
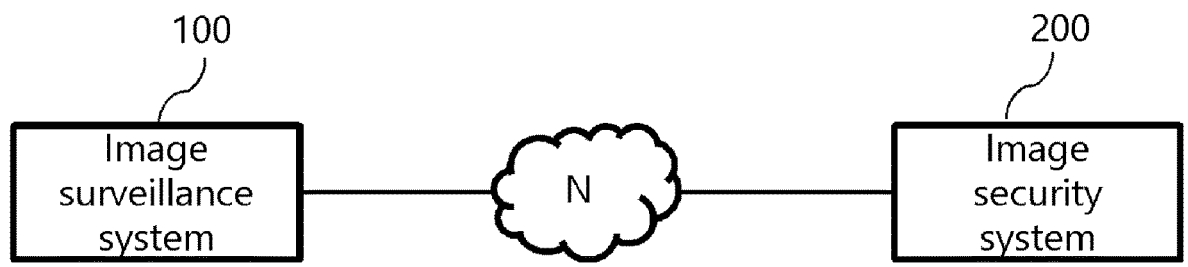
FIG. 1 is a diagram illustrating a schematic configuration of a system for performing a privacy masking method according to an embodiment of the present invention.

FIG. 1 is a diagram illustrating a schematic configuration of a system for performing a privacy masking method according to an embodiment of the present invention.

Referring to FIG. 1, the system according to the embodiment includes an image surveillance system 100 and an image security system 200.

The image surveillance system 100 may use a surveillance camera, such as a CCTV, an IP camera, or the like, which obtains an image, to obtain images in various places for real-time collection and recording. Afterward, the collected images may be transmitted to the image security system 200, which will be described later. Herein, the image surveillance system 100 and the image security system 200 are connected to each other through a network (N) to transmit and receive information from each other. The network (N) may refer to a network, such as the Internet, an intranet, a mobile communication network, a satellite network, or the like, which is capable of transmitting and receiving data with an Internet protocol by using various wired/wireless communication technology. In the meantime, the network may refer to a closed network such as a local area network (LAN), a wide area network (WAN), and the like; an open network, such as the Internet; a network, such as code division multiple access (CDMA), wideband code division multiple access (WCDMA), global system for mobile communication (GSM), Long Term Evolution (LTE), Evolved Packet Core (EPC), and the like; a next generation network which will be realized in the future; and a computing network.

The image security system 200 may provide integrity and confidentiality to enhance reliability of the collected images obtained by the surveillance camera of the image surveillance system 100. According to the embodiment, in order to protect a region related to personal information within the collected image, the image security system 200 may encrypt the region related to the personal information within the image by using the privacy masking technique, for storage. Herein, the personal information may refer to information related to privacy, such as a person's face, a vehicle identification number, or the like.

In the meantime, in order to protect the region related to the personal information within the collected immage, the image security system 200 may encrypt the region related to the personal information within the image by using the privacy masking technique for storage, but may perform masking on the privacy region by using format-preserving encryption. That is, in the related art, in order to solve the problem that personal information leakage and privacy invasion occur due to exposure of the personal information present within the image, the privacy masking technique is introduced in which masking is performed on the region that contains the personal information; however, the privacy masking technique has a problem that storage space is wasted because additional space is required to encrypt the image corresponding to the privacy region. However, when masking is performed on the privacy region using format-preserving encryption according to the present invention, it is possible to solve the above-described problem that the storage space is wasted.

The privacy masking method using format-preserving encryption in the image security system 200 will be described in detail with reference to FIG. 2.

Figure 2:
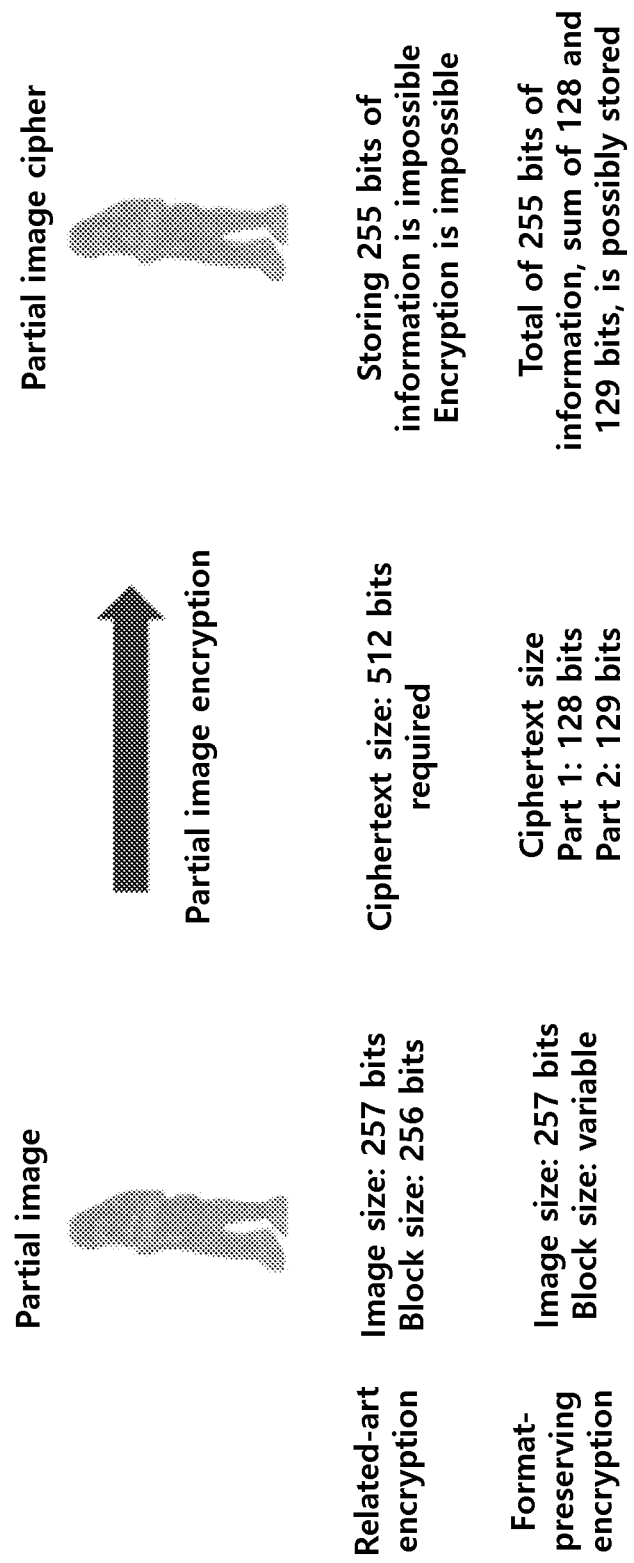
FIG. 2 is a diagram schematically illustrating procedure of a privacy masking method according to an embodiment of the present invention.
Figure 3:
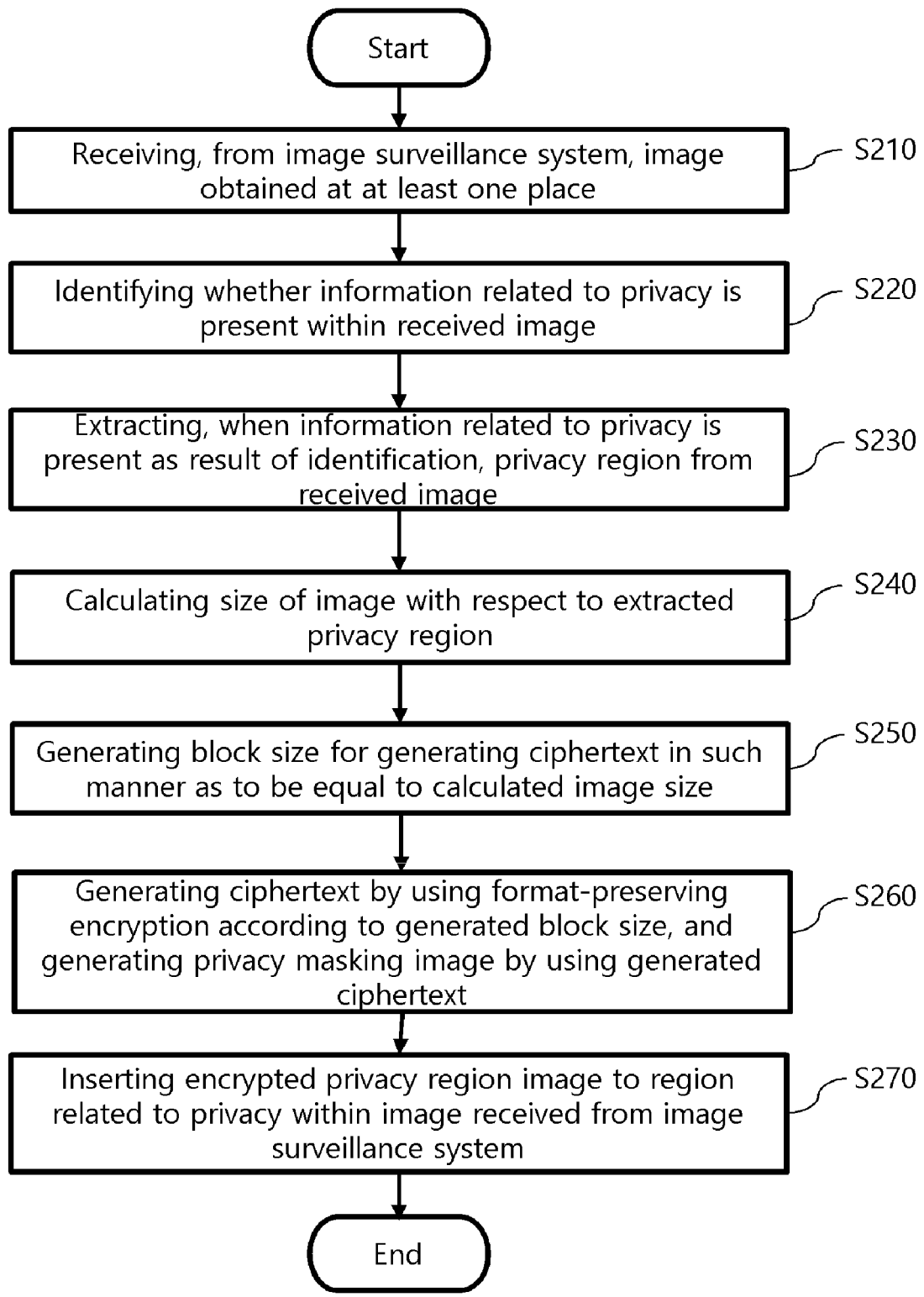
FIG. 3 is a diagram illustrating an example of an image encryption process using format-preserving encryption according to an embodiment of the present invention, and of an image encryption process in the related art.

FIG. 2 is a diagram schematically illustrating procedure of a privacy masking method according to an embodiment of the present invention. FIG. 3 is a diagram illustrating an example of an image encryption process using format-preserving encryption according to an embodiment of the present invention, and of an image encryption process in the related art.

Referring to FIG. 2, the privacy masking method according to the embodiment includes: receiving, from the image surveillance system, an image obtained at at least one place at step S210; identifying whether information related to privacy is present within the received image at step S220; extracting, when the information related to privacy is present as a result of the identification, a privacy region from the received image at step S230; calculating a size of an image with respect to the extracted privacy region at step S240; generating a block size for generating ciphertext in such a manner as to be equal to the calculated image size at step S250; generating the ciphertext by using format-preserving encryption according to the generated block size, and generating a privacy masking image by using the generated ciphertext at step S260; and inserting the encrypted privacy region image to the region related to privacy within the image received from the image surveillance system at step S270.

First, at the receiving, from the image surveillance system, of the image obtained at the at least one place at step S210, the image security system 200 receives the image obtained by a CCTV, an IP camera, or the like, from the image surveillance system through the network. Herein, the received image may contain the information related to privacy. Herein, examples of the information related to privacy may include the person's face and vehicle identification number information, which cause privacy invasion when being released, and may also include an exposure-prohibited region, such as a military facility, a window of a building, and the like that require privacy protection like the privacy region.

At the identifying of whether the information related to privacy is present within the received image at step S220, the image security system 200 identifies whether the information related to privacy is contained within the image received from the image surveillance system at step S210. The image security system 200 may identify whether the information related to privacy is present within the image, by using known various algorithms.

At the extracting, when the information related to privacy is present as the result of the identification, of the privacy region from the received image at step S230, the image security system 200 extracts a region in which privacy protection is required within the received image. For example, when the image contains the face identifiable for the person, the vehicle identification number plate identifiable for the vehicle, or the like, the privacy region extracted to perform privacy masking on the person's face and the vehicle identification number plate. Herein, the image security system 200 may extract the region in which privacy protection is required within the image, by using known various algorithms. For example, the image security system 200 may detect the privacy region using at least one among edge information, shape information, color distribution information of the image, and learning information of the privacy region. For example, the edge information may be obtained through analysis of the image, and the boundary between the face and the non-face portion may be detected using the edge information. Whether the face is present in the image may be determined by comparing the result of the analysis of the image and the shape information on the shape of the face, or the like. Also, the color distribution information may be compared with color distribution information unique to the face, so that it is possible to more accurately detect the face region. Also, it is possible to detect the face region using the learning information of the privacy region, which includes an Adaboost learning technique, or the like.

In the embodiment, although the process of identifying whether the information related to privacy is present in the received image and the process of extracting the privacy region are described as separate processes, these processes may be performed as a single process. In the case of a single process, in order to recognize the person's face, the vehicle identification number plate, or the like in the received image, various types of image analysis and recognition algorithms may be used to identify whether the information related to privacy is present within the image, and the privacy region may be extracted.

At the calculating of the size of the image with respect to the extracted privacy region at step S240, the image security system 200 calculates the size of the image with respect to the privacy region in which privacy masking is required. The reason that the size of the image is calculated is to utilize the same to determine the size of the block for generating the ciphertext by using format-preserving encryption, which will be described later.

At the generating of the block size for generating the ciphertext to be equal to the calculated image size at step S250, the image security system 200 divides the size of the block for generating the ciphertext in such a manner as to be equal to the size of the privacy region (the image size calculated at step S240). For example, assuming that the size of the privacy region calculated at step S240 is 257 bits, the size of the block is divided to be equal to the calculated size of the privacy region at step S250. Herein, according to the embodiment, the image security system 200 divides the size of the block for generating the ciphertext in such a manner as to be equal to the size of the privacy region (the image size calculated at step S240). A block size in a fixed size is generated first (primary block size generation), and a block size in a variable size is generated by subtracting the generated block size in the fixed size from the calculated size of the privacy region (secondary block size generation). For example, assuming that the size of the privacy region calculated at step S240 is 257 bits, the block size in a fixed size of 128 bits is generated first, and the block size (129 bits) in a variable size is generated by subtracting the generated block size (128 bits) in the fixed size from the calculated size (257 bits) of the privacy region. As described above, at step S250, even though any size of the privacy region is calculated, the size of the block is variably determined, so that it is possible to prevent waste of the storage space. That is, as shown in FIG. 3, in the related art, when the image size of the portion in which privacy masking is required is 257 bits and the size of the block is 256 bits, there is 1 bit short. Thus, an additional block size of 256 bits is required, and it is impossible to store information in 255 bits, resulting in waste of the storage space. However, according to the embodiment, the size of the ciphertext is variably generated, so that it is possible to prevent waste of the storage space.

At the generating of the ciphertext by using format-preserving encryption according to the generated block size, and the generating of the privacy masking image by using the generated ciphertext at step S260, the image security system 200 generates the ciphertext using format-preserving encryption according to the block size generated at step S250. The format-preserving encryption is for generating the ciphertext in the same format as the plaintext. For example, regarding information such as a resident registration number, and a Social Security number (SSN) which are represented in decimals, ciphertext represented in decimals is generated in the same format. Also, in the embodiment, it is possible to variably generate the length of the ciphertext using format-preserving encryption, so that it is possible to prevent waste of the storage space. Since format-preserving encryption is well known, a detailed description thereof will be omitted. In the meantime, masking may refer to various methods of personal information protection processing in which encryption, a mosaic, scrambling, a blur filter, and the like are used to make the portion on which personal information protection processing need to be performed not to be identified. A personal information protection processing region may be represented in block or in a blur region according to the masking method. Afterward, the image security system 200 generates the privacy masking image using the generated ciphertext. That is, the image security system 200 inserts the generated ciphertext to the position corresponding to the privacy region so that the encrypted privacy region image is generated. As described above, the ciphertext is generated in the extracted privacy region by using format-preserving encryption, and the generated privacy masking image is inserted using the generated ciphertext, so that the original image is not changed and thus it is easy to reconstruct privacy masking. Thus, if the related image is used as a submission for identification of crime and terror, it can be used efficiently.

Figure 4:
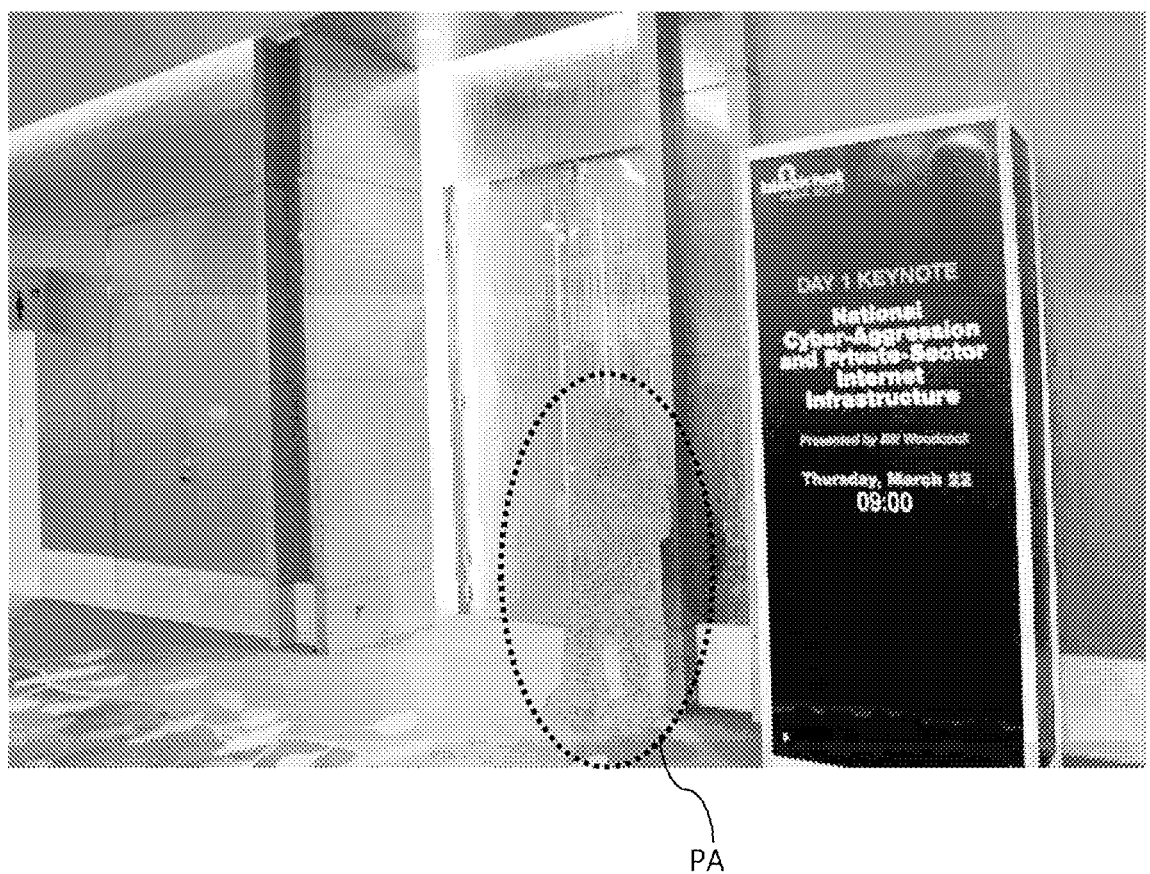
FIG. 4 is a diagram illustrating an example of a privacy region, on which masking is performed, within an image according to an embodiment of the present invention.

At the inserting of the encrypted privacy region image to the region related to privacy within the image received from the image surveillance system at step S270, the image security system 200 inserts, as shown in FIG. 4, the encrypted privacy region image to the image received from the image surveillance system so that the region related to the personal information is protected to prevent personal information leakage and privacy invasion from occurring. FIG. 4 is a diagram illustrating an example of a privacy region, on which masking is performed, within an image according to an embodiment of the present invention. It is found that masking (masking for the privacy region) (PA) is performed on a person contained in an image obtained at a place.

The methods according to the embodiments of the present invention may be implemented as an application or may be implemented in the form of program instructions that can be executed by various computer components, and may then be stored on a computer-readable recording medium. The computer-readable recording medium may include program instructions, data files, data structures and the like, separately or in combination. The program instructions to be recorded on the computer-readable recording medium may be specially designed and configured for embodiments of the present invention, and may be well-known and be usable by those skilled in the art of computer software. Examples of the computer-readable recording medium include magnetic recording media such as hard disks, floppy disks and magnetic tapes; optical media such as CD-ROMs, and DVD-ROMs; magneto-optical media such as floptical disks; and hardware devices, such as read-only memory (ROM), random-access memory (RAM), and flash memory, which are particularly structured to store and implement the program instructions. Examples of the program instructions include not only a mechanical language code formatted by a compiler but also a high level language code that may be implemented by a computer using an interpreter, and the like. The hardware devices may be configured to be operated by one or more software modules for executing the operations according to the present invention, and vice versa.

While this specification contains many features, the features should not be construed as limiting the scope of the present invention or the appended claims. Also, the features described in the individual embodiments of the present invention can be implemented in combination in a single embodiment. Conversely, various features described in a single embodiment of the present invention can be implemented in multiple embodiments separately or in any suitable sub combination.

Although the drawings describe the operations in a specific order, one should not interpret that the operations are performed in a specific order as shown in the drawings or successively performed in a continuous order, or that all the operations need to be performed to obtain a desired result. Multitasking or parallel processing may be advantageous under a particular environment. Also, it should be understood that all embodiments do not require the distinction of various system components made in the above-described embodiment. The above-described application components and systems may be generally implemented as a single software product or multiple software product packages.

Various substitutions, modifications, and changes from the spirit of the present invention defined in the following claims by those skilled in the art are also included in the scope of the present invention, so that the present invention described above is not limited to the embodiments and the accompanying drawings.

What is claimed is:

1. A privacy masking method using format-preserving encryption in an image security system, the method comprising:
   receiving, from an image surveillance system, an image obtained at at least one place;
   identifying whether information related to privacy is present within the received image;
   extracting, when the information related to privacy is present as a result of the identification, a privacy region from the received image;
   calculating an image size of an image;
   calculating a region size of the extracted privacy region;
   generating a first block having a first size corresponding to an integer number of a results of dividing the image size by the region size, wherein the first size is a fixed size;
   generating a second block having a second size corresponding to a result of subtracting the first size from the region size, wherein the second size is a variable size;
   generating ciphertext in such a manner as to be equal to the region size, by using format-preserving encryption according to a sum of the first size and the second size, and generating a privacy masking image by using the generated ciphertext; and
   inserting the encrypted privacy region image to the region related to privacy within the image received from the image surveillance system.

2. The privacy masking method of claim 1, wherein the generating comprises:
   generating an encrypted privacy region image by inserting the generated ciphertext to a position corresponding to the privacy region.

3. The privacy masking method of claim 2, wherein in the format-preserving encryption, a length of the ciphertext is variably determined according to a size of the image that needs to be encrypted, and masking is performed on the privacy region.

4. The privacy masking method of claim 1, wherein the information related to privacy is at least one among a person's face, a vehicle identification number, and an exposure-prohibited region.

5. A non-transitory computer-readable recording medium having a computer program recorded thereon, the recording medium for performing the privacy masking method using format-preserving encryption in an image security system according to claim 1.

\* \* \* \* \*